United States Patent [19]

Kappas

[11] 3,906,887
[45] Sept. 23, 1975

[54] ELECTRIC OUTBOARD MOTOR

[76] Inventor: Chris S. Kappas, 218 13th St., Racine, Wis. 53403

[22] Filed: Mar. 29, 1974

[21] Appl. No.: 456,247

[52] U.S. Cl. .............................. 115/18 E; 310/87
[51] Int. Cl.² ........................................ B63H 21/26
[58] Field of Search ............. 115/17, 18 E; 310/87; 318/345; 290/43, 54

[56] References Cited
UNITED STATES PATENTS

| | | | |
|---|---|---|---|
| 3,593,050 | 7/1971 | Ware | 310/87 |
| 3,648,142 | 3/1972 | Corey et al. | 318/345 |
| 3,721,879 | 3/1973 | Corey et al. | 318/345 |

*Primary Examiner*—Trygve M. Blix
*Assistant Examiner*—Charles E. Frankfort
*Attorney, Agent, or Firm*—James E. Nilles

[57] ABSTRACT

An electric outboard motor has speed control unit mounted on a metal U-shaped bracket which is releasably clamped within a forward cup-shaped housing of the lower motor and propeller unit. The bracket includes a cantilevered plate with a power transistor riveted to the back side thereof. The power transistor is connected in series with a dc motor and having a control input connected in a series of input circuits with a limiting resistor and a diode also mounted on the bracket. The cup-shaped housing is formed with oppositely located flat walls resiliently engaged by the side arms of the bracket. The cantilevered plate locates the transistor in firm pressure engagement with an adjacent outer wall of the housing with a thermal conducting grease therebetween for efficient cooling. An insulating plate is securely mounted to the open end of the housing to clamp the bracket in place and locate motor contact brushes within an adjacent motor housing of the propeller unit. Power and control leads extend upwardly through a hub in the cup-shaped housing and a vertical mounting pipe to an upper housing having a steering handle. Battery leads terminate within the upper housing and are connected to the power and connecting leads. A small variable potentiometer mounted in the handle is connected to the control lead to supply bias current to the control input circuit. A reversing switch connects to the dc motor a power lead in series to a battery lead. A speed selection switch connects the second battery lead to the opposite side of the reversing switch for high speed operation or to the power transistor to complete the variable low speed circuit.

11 Claims, 12 Drawing Figures

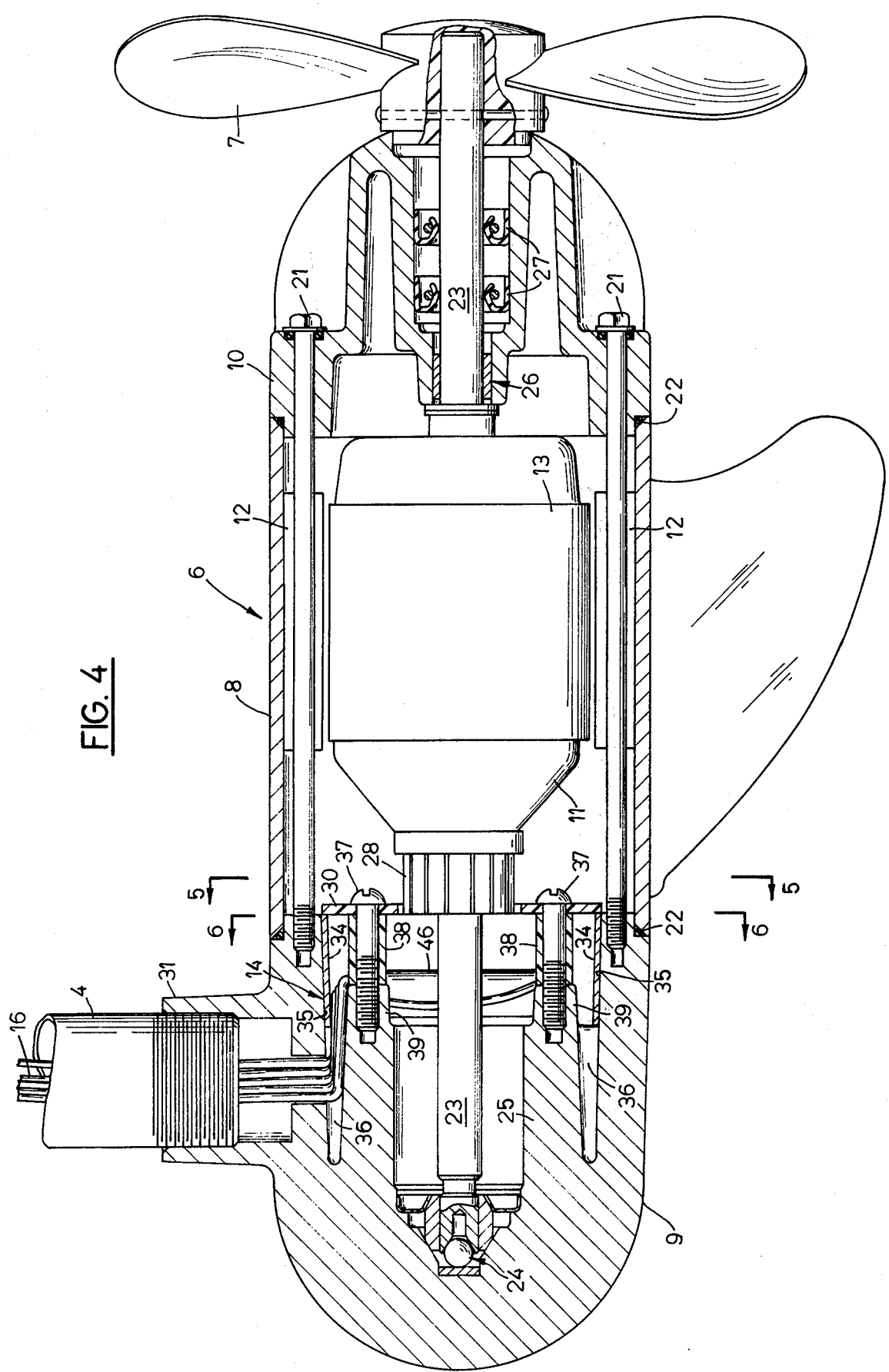

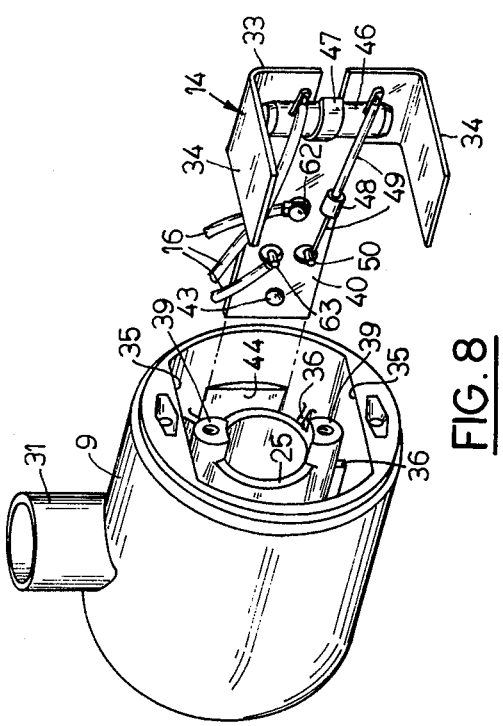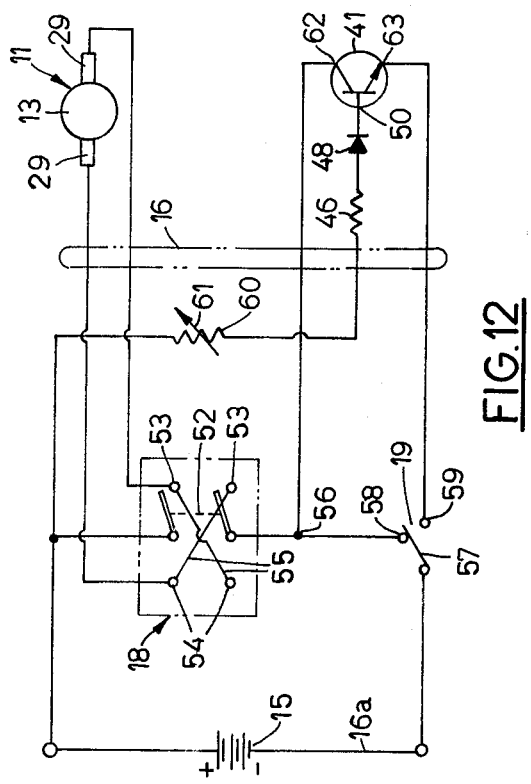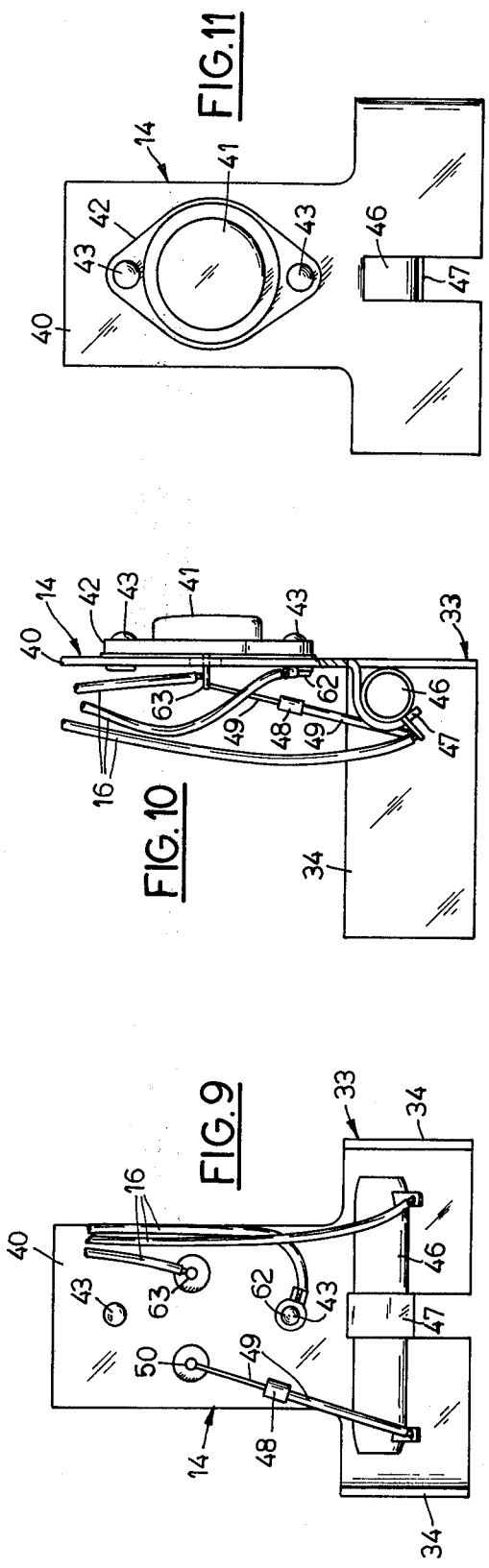

3,906,887

ELECTRIC OUTBOARD MOTOR

BACKGROUND OF THE INVENTION

This invention relates to an electric outboard motor.

Small, low powered outboard motors are widely employed for marine boat propulsions at relatively low speeds. For example, fishermen often employ a small outboard motor for moving between and to various fishing locations on a body of water and further, slowly move under power for trolling and the like. Electric outboard motors may advantageously be employed because they can be constructed as relatively lightweight units which can be conveniently manually carried and mounted and removed from the boat. Further, the construction of electric outboard motors is relatively simple and consequently can be produced at a relatively low cost. Generally, a small permanent magnet dc motor may be mounted as a part of a submergible propeller unit. The lower unit is secured to a suitable support housing having means for attachment to the boat transom. The upper end is provided with suitable electrical controls for controlling the speed of the motor and therefore of the propulsion means as well as a steering means for pivoting the propeller lower unit about a vertical axis. The motor speed is controlled by adjusting the current supplied to the motor generally through the use of a relatively large series connected rheostat. Although such systems operate satisfactory, large rheostats require mounting to the top side of the outboard unit and create relatively large power losses. Although electronic control systems have been suggested, electronic switches and the like are extremely temperature sensitive and require special constructions and considerations. Further, special skill and technology is required to service such electronic control systems which cannot conveniently be provided in many areas, particularly areas of remote locations where a significant number of similar electric outboard motors will not be encountered.

SUMMARY OF THE INVENTION

The present invention is directed to an electric outboard motor and particularly to an improved speed control unit which is mounted within a lower unit as a replaceable integrated assembly which can be produced at a relatively low cost so as to permit complete replacement of the sub-unit in the event of failure therein as well as convenient maintenance of the removed assembly. Generally, the motor current control unit includes a solid state switch which may advantageously be a power transistor connected in series with a direct current motor and functioning as a current amplifier. The control input of the transistor is connected in series with a variable resistance control which can, of course, be a relatively small, compact unit as it controls a relatively low level signal current. The power transistor is readily able to carry the power level required by the motor. The control input circuit to the transistor includes a fixed resistance as well as a polarity safety diode. The fixed resistance limits the maximum control current and thereby controls the maximum collector current. The diode prevents reverse current flow through the power transistor which would, of course, result in damage and possible complete destruction of the power transistor in the event of reverse polarity battery connection.

The control unit including the power transistor, the diode, and the fixed resistor are formed as a part of the sub-unit mounted within the lower propeller unit. The sub-unit in accordance with a particularly novel aspect of the present invention includes a generally U-shaped mounting bracket or support formed of a suitable metal such that the side arms have a limited resiliency. The power transistor is riveted to the exterior of the base portion of the U-shaped support or bracket. The fixed resistor is clamped or otherwise suitably mounted to the support, and the diode is connected between the fixed resistor and the control signal element or terminal of the power transistor.

The lower propeller unit is further provided with a central motor housing section enclosed at the forward end by a mounting and control housing section and at the opposite end by a propeller support section housing. The control housing section is specially constructed as a generally cup shaped member with the one end of the motor shaft properly supported coaxially therein. The control housing section is formed with relatively flat walls to opposite sides thereof to accommodate the U-shaped bracket with a resilient interengagement of the side arms to the walls. The base section locates the mounted power transistor in firm pressure engagement with an adjacent outer wall of the housing section. The interengaging surfaces are preferably provided with a good thermal conducting grease or the like to provide maximum thermal conductivity therebetween and thereby promote the efficient cooling of the power transistor. The sub-unit is preferably clamped within the control section housing by an insulating plate mounted to the open coupling end of the housing section by suitable clamping screws. The insulating plate conveniently provides a mounting means for the contact brushes of the motor. The control housing section further includes a suitable mounting hub to which the mounting member is secured as by a threaded engagement.

The power and control leads are connected to the power leads of the power transistor and to the fixed resistor and extend upwardly through the hub and outboard motor support and mounting element. If it is ever necessary to service the unit, the housing sections are readily separated and the control assembly conveniently removed and replaced with a total new assembly if required, either because of the lack of the ability to repair or lack of proper components for repairing of the sub-unit.

A control unit is provided at the steering control with a small variable potentiometer mounted therein and connected in series with a lead from the fixed resistor. The control unit includes incoming power leads having releasable terminal connections for connection to a conventional 12 volt battery or the like. Power leads to the motor are also connected through the mounting element and interconnected at the control unit in circuit to the battery and the leads from the power transistor for selectively connecting the motor into the power circuit and simultaneously permitting connection of the variable speed control. Generally, the control circuit provides for reversing of the motor connections for reversible motor drive. Preferably the system will also provide for a variable low speed control permitting adjustment of the motor speed over a low range in combination with a high range power setting to permit operating of the motor at maximum speed. In accordance with the present invention a forward and reverse switch interconnect the dc motor to the one side of the battery connecting power leads. The opposite side of the switch is connected to the one power transistor lead and to a low speed-high speed switch. In a high speed setting, the switch directly connects the corresponding side of the reversing switch to the return side of the battery and thus directly connects the motor across the battery. This simultaneously opens a return path from the power transistor and thereby effectively completely disconnects the power circuit and the control signal circuit from the battery. In the alternate position, the direct current path return is open circuited and the return path from the power transistor is completed thereby interconnecting of the power transistor in series with the reversing switch and the motor and simultaneously completing the control signal return path.

The present invention thus provides a reliable and relatively simple electric outboard motor drive which can be constructed with minimum cost and permits convenient and relatively inexpensive subsequent servicing.

These and other objects and advantages of the present invention will appear hereinafter as this disclosure progresses, reference being had to the accompanying drawings.

BRIEF DESCRIPTION OF THE DRAWINGS

FIG. 4 is an enlarged vertical section through the lower unit of the outboard motor shown in FIG. 1;

FIG. 8 is a perspective, exploded view of a portion of the lower unit showing the integrated motor control unit;

FIG. 9 is a front elevational view of the integrated motor control unit;

FIG. 10 is a side elevational view of FIG. 9 with parts broken away and sectional;

FIG. 11 is a back elevational view of the integrated motor control unit; and

FIG. 12 is a schematic circuit diagram of a preferred motor control circuit such as shown in FIGS. 2–11.

DESCRIPTION OF A PREFERRED EMBODIMENT

Figure 1:
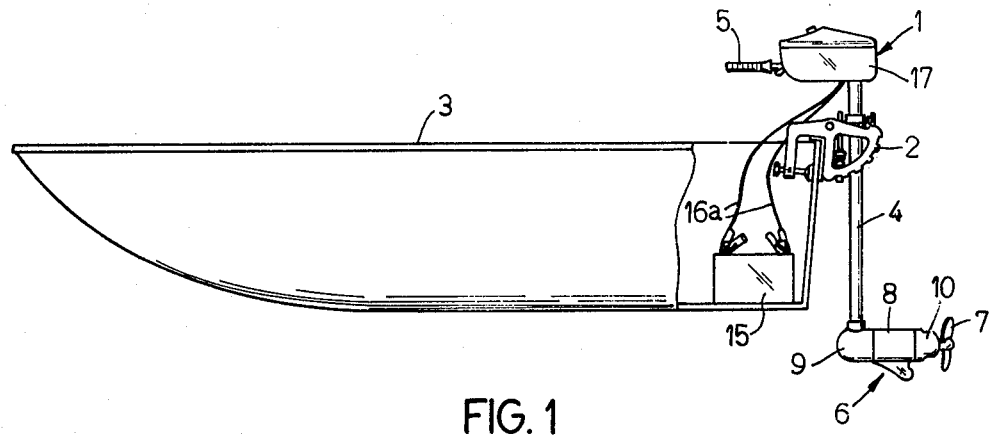
FIG. 1 is a simplified side elevational view of a boat with an electric outboard motor mounted to the aft end thereof.

Referring to the drawings and particularly to FIG. 1, an electric outboard motor 1 includes a coupling or mounting unit 2 for pivotal mounting of the unit to the transom of a boat 3. Thus the outboard motor generally includes a vertical support member shown as a pipe-like member 4 to which the mounting unit 2 is attached. A handle 5 is provided at the upper end for pivoting of the outboard motor 1 about a vertical axis for corresponding positioning of a lower propeller unit 6 having a driven propeller 7 mounted on the aft end thereof. The lower unit 6 generally includes a central motor housing 8 with a control housing 9 secured to the forward end and propeller support 10 secured to the aft end thereof. As shown in FIG. 4, a permanent magnet electric motor 11 is mounted within the housing 8 and generally includes a permanent magnet stator 12 within which a rotor 13 is mounted and coupled to drive propeller 7. In accordance with the present invention a power control unit 14 is mounted within the housing 9 and interconnected to the motor 11 and to a battery 15 by a plurality of leads 16 which extend upwardly through the pipe 4 and are suitably interconnected to the battery or power leads 16a within a control box 17 on the upper end of pipe 4. The control box 17 further is provided with a central molded housing or the like within which a forward-reverse control switch 18, a high speed-low speed switch 19 are provided for selectively connecting of the power control unit 14 to the motor 11. The handle 5 is secured to control box 17 and includes an outer rotatable port 20 to form a variable speed control element.

Figure 2:
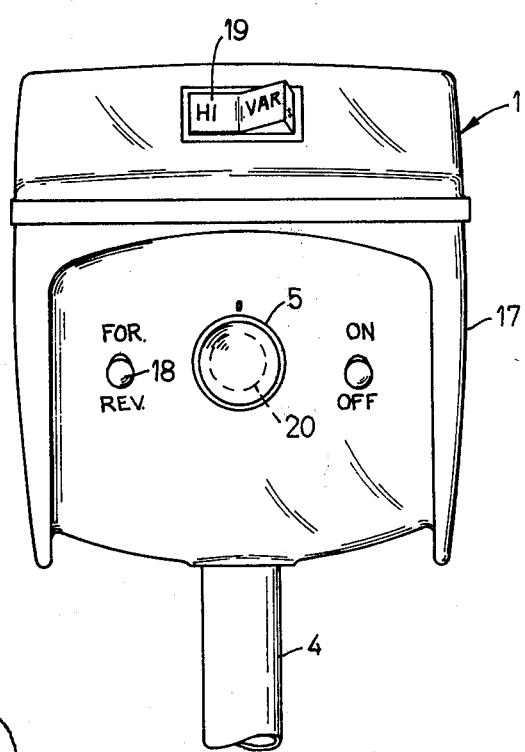
FIG. 2 is an enlarged front elevational view of the upper end of the outboard motor.
Figure 3:
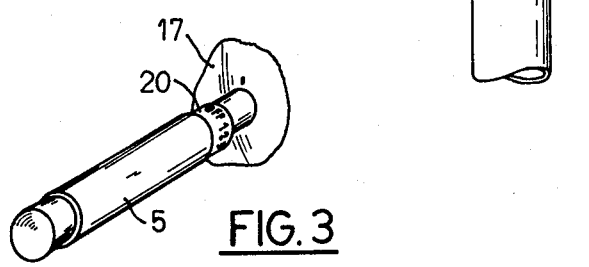
FIG. 3 is a perspective view of the motor control steering and speed control handle.

More particularly as illustrated in FIGS. 2–4, the several housing sections 8, 9 and 10 are mounted in coaxial relationship with a plurality of interconnecting bolts 21 passing through the end propeller housing 10 and threaded into approximately tapped openings in the control housing 9 to clamp the housing section 8 therebetween. Suitable O-ring seals 22 are located between the opposite ends of the housing 8 and the end housings 9 and 10 to establish water tight joints. The permanent magnet 12 is an annular magnet suitably secured within the housing 8. The rotor is a conventional wound rotor secured to a motor shaft 23 which extends through the housing 8 with the inner end extending and supported by an inner ball thrust and radial bearing assembly 24 secured within the base portion of an internally formed hub 25 in the housing 9. The opposite end of the shaft is supported by a radial and thrust washer bearing assembly 26 in the housing 10. The shaft 23 extends outwardly of the housing with the propeller 7 appropriately secured thereon. Suitable spring loaded seals 27 encircle the shaft outwardly of the assembly 26 to maintain a fluid tight or a liquid tight sealing of the housing to prevent entrance of water into the motor chamber which could of course destroy the motor.

Figure 5:
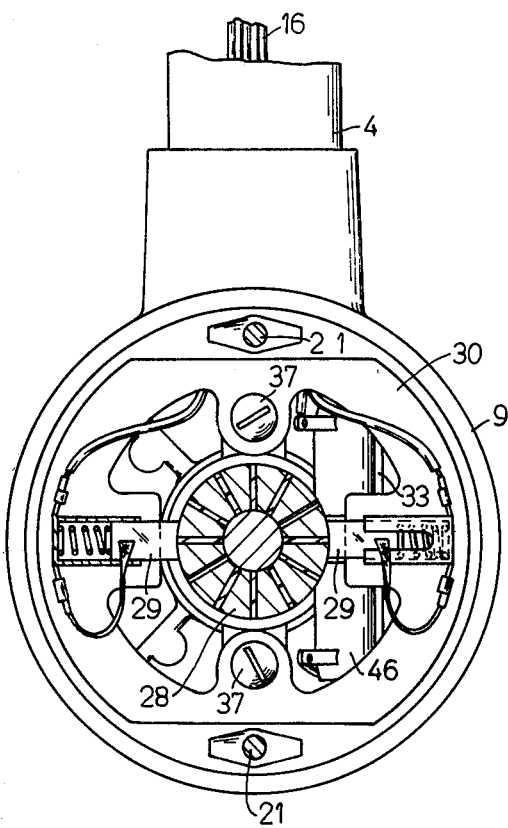
FIG. 5 is a view taken generally on line 5—5 of FIG. 4.

As shown in FIGS. 4 and 5, the rotor 13 is a conventional wound rotor having the several windings connected to a commutator 28 on the motor shaft immediately adjacent to the control housing 9. Suitable contact brushes 29 are secured in engagement with the commutator 28 and are mounted on an insulating plate 30 attached to the housing 9 as more fully developed hereinafter.

The housing 9 is generally a cup-shaped member open toward the housing section 8. A mounting hub 31 is formed in the central portion of the housing 9 and is interiorly threaded to correspondingly receive the threaded lower end of the mounting pipe 4, with the leads 16 passing upwardly through a top wall opening in the housing in the base of the hub portion 31.

Figure 6:
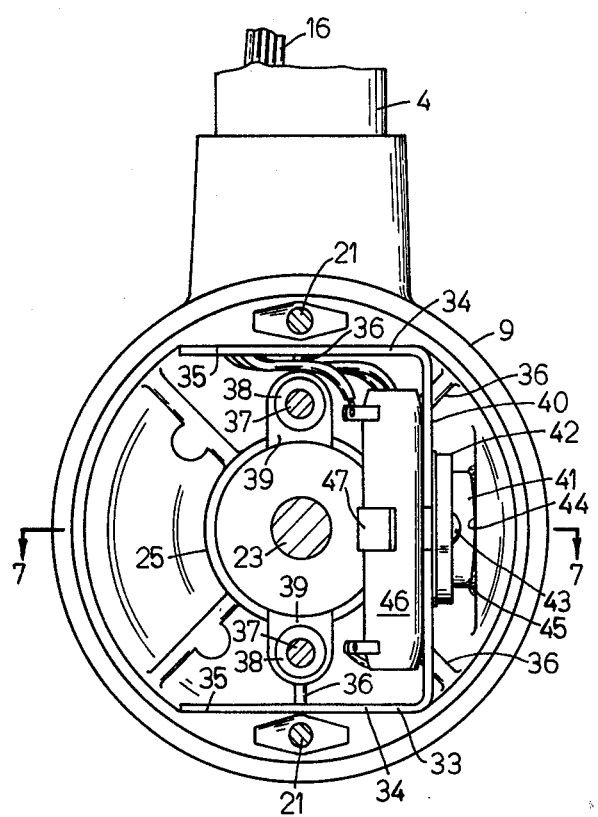
FIG. 6 is a view taken on line 6—6 of FIG. 3.
Figure 7:
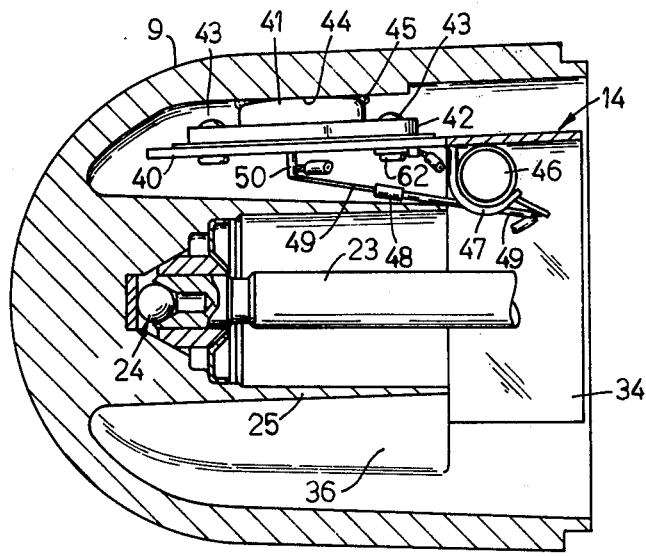
FIG. 7 is a view taken generally on line 7—7 of FIG. 6.

The control unit 14 is formed as an integrated replaceable element mounted within the housing 9 as more clearly shown in FIGS. 6–8. In the illustrated embodiment of the invention, the control unit 14 includes a generally U-shaped or channel mounting bracket 33 located within the housing section 9 and having a pair of parallel side arms 34 resiliently engaging opposed flat interior walls 35 of the control housing 9 for convenient assembly and stable support within the housing.

The inner edges of the arms 34 are held in abutting engagement with a pair of aligned stop walls 36 formed between the internal shaft hub 25 and the outer housing wall. The bracket 33 is clamped within the housing abutting the stop wall by the brush mounting plate 30. Thus, brush mounting plate screws 37 are shown extended through the mounting plate and suitable spacer supports 38 with the innermost end threaded to suitably tapped bosses 39 on the shaft hub 25 of the control housing 9.

The U-shaped bracket further includes an inner cantilevered tongue or plate 40 and projecting inwardly of the control housing between the hub 31 and the outer wall of the housing 9. A solid state amplifying element 41 such as a power transistor is secured to the back or outer side of the plate 40.

Referring particularly to FIGS. 9–11, the illustrated amplifying element is a power transistor having a base with mounting flanges 42 riveted to the plate 40 as by rivets 43 to provide a rigid firm mounting of the element. The outer surface of the amplifying element is a flat planar wall member which resiliently engages a correspondingly shaped flat wall portion 44 on the interior of the control housing as a result of the cantilevered extension plate 40. This provides good thermal conductivity between the element 41 and the housing to provide maximum or efficient cooling of the switch element. As shown in FIGS. 6 and 7, a silicone grease 45 or the like may advantageously be located between the spring loaded mounting of the power transistor 41 and the wall 44 to further enhance the thermal conductivity therebetween. In this manner, a reliable mounting of a power transistor is obtained to maintain a long reliable operating life.

The control unit further includes a current limiting resistor 46 secured to the mounting plate. In the illustrated embodiment of the invention, the resistor 46 is shown as a tubular or cylindrical member securely abutting the plate by a struck-out clamping lip 47 integrally connected to the transistor mounting plate 40. A protective diode 48 is connected by suitable supporting leads 49 formed of a relatively stiff connecting wire between the one end of the resistor 46 and an appropriate control terminal 50 of the power transistor 41; for example, as more clearly illustrated in FIG. 9. The transistor 41, resistor 46, and diode 48 form the principal current controlling elements for varying the current supplied to the motor over a relatively wide range and the integrated mounting and connection on the mounting bracket provides a very simple and low cost construction. The total sub-assembly is conveniently soldered to the appropriate connecting leads and inserted into the housing 9 with the insulating plate 30 attached to firmly mount the sub-assembly in place. If the system malfunctions for any reason, the total low cost sub-assembly can be removed and readily replaced without any significant skill requirements.

Referring to FIG. 12, the control circuit for the motor rotor 13 is schematically illustrated with the controlled leads identified by an interconnecting correspondingly numbered loop 16. The portion of the circuit to the right of the illustrated loop 16 is housed within the lower unit 6 while the portion of the circuit shown to the left of the loop 16 except for the battery 15 is housed within the control box, with the incoming connecting leads 16a releasably connected to the opposite terminals of the battery 15.

More particularly, the reversing switch 18 is connected to the positive side or lead. The switch 18 is illustrated as a well known double-pole, double-throw switch having a double-pole contact arm 52 selectively engaging a set of forward contacts 53 and a set of reverse contacts 54. The opposite individual contacts of the sets of contacts 53 and 54 are interconnected by jumper leads 55, and one contact of each corresponding set is connected to the motor brushes 29 by the motor lead which extend downwardly through the connecting pipe. The one side of the common contact arm 52 is connected to the positive lead while the other contact arm is connected to a common terminal point 56. The power flows for the positive lead through the motor rotor 13 in opposite directions in accordance with the setting of the reversing switch 18 and then to the common terminal point 56 from which it flows via a lead 16 to the circuit of the power transistor 41 for a variable low speed operation or directly to the battery 15 for a high speed operation depending upon the setting of switch 19.

The switch 19 is illustrated as a single-pole, double-throw switch having a common contact pole 57 connected to the return or negative side of the battery 15. The pole 57 selectively engages a high speed contact 58 connected directly to the common terminal point 56. In the alternate low speed position, it engages a low speed contact 59 which is connected to the return or ground side of the amplifying circuit. In this position a completed circuit is provided from the common terminal point 56 through the power transistor 41 to the common return side of the battery 15 and also completes the control circuit path of the fixed resistor 46 and the diode 48 to the signal terminal 50 of the power transistor 41. This circuit includes a potentiometer 60 located within handle 5 and controlled by the setting of the control handle, as shown diagrammatically in FIG. 5 by the adjustment arrow 61. The potentiometer 60 is connected directly in series to the positive side of the battery 15 and thus provides an adjustable current supply to the signal terminal 50 of the power transistor 41.

The illustrated power transistor is a conventional NPN transistor having a collector 62 connected by the control lead to the common terminal 56 within the control box 14. The base of the transistor 41 constitutes the control signal terminal 50 and is connected to the cathode of the protective diode 48. The emitter 63 of the transistor constitutes the negative return and is connected to the low speed contact 59 of the speed selection switch 19. The current flow through the motor rotor 13 is completed from the common terminal 56 through the collector 62 to the emitter 63 circuit of the power transistor 41 and then through the return switch 19 to the battery 15. The amount of current flow is directly controlled by the low lead current bias provided through the base to emitter circuit of the power transistor 41 in accordance with well known transistor operation. This current level is accurately controlled by the potentiometer 60. As the signal current is of a relatively minute level, the potentiometer 61 in turn may be a very small compact unit readily mounted within the confined portion of the control handle 5.

The fixed resistor 46 establishes the maximum current flow or signal to the power transistor 41. Thus when the potentiometer 61 is set to zero, the maximum base current flow is established and thereby establishes the maximum motor current flow that may exist in the low speed mode. As the potentiometer resistance is increased, the signal current will decrease and the motor current will correspondingly decrease to reduce the motor speed.

The diode 48 protects the base to emitter circuit in the event of a reverse battery connection by preventing reverse current flow through the base to the emitter circuit. This, This, of course, is extremely important in connection with power transistors and the like to prevent severe damage and destruction of the transistor.

The illustrated circuit provides a very simple circuit employing a minimum number of components. It thus permits construction of a relatively inexpensive system or control which can be readily mass produced and in particular provides a system particularly adapted to forming of the integrated solid state control as a replaceable sub-assembly.

The present invention thus provides a simple, reliable and relatively inexpensive control for an electric outboard motor.

I claim:

1. An electric outboard motor having a lower submergible propeller unit, comprising a drive motor, a lower propeller drive housing enclosing said motor and having a control housing section with an access opening and having an outer wall portion, a motor control bracket, a multiple element motor control circuit including a solid state switch and interrelated control elements mounted on said bracket, releasable mounting means connected to the control housing section and to the bracket, said bracket including a mounting portion releasably clamped within the housing section and having a flat cantilevered plate extending therefrom, said solid state switch being mounted to the back side of said plate and bending said plate relative to the channel portion with the switch engaging the wall portion.

2. The electric outboard motor of claim 1 wherein said switch is a power transistor affixed to the back side of the plate with a flat outer enclosure wall engaging said outer wall portion of said control housing section.

3. The electric outboard of claim 2 having a vertical mounting member and upper control unit, said motor control circuit including a variable current control member connected to the control unit with leads extending through the vertical mounting member and connected to said transistor to control the energization of the motor.

4. The electric outboard motor of claim 3 wherein said motor control circuit includes a current limiting resistor, said resistor being releasably mounted on said bracket, a diode, supporting and conducting leads connected between said resistor, said switch, and said diode.

5. The electric motor of claim 1 having a hollow vertical mounting member and including an upper terminal housing, power supply leads terminated in said terminal housing, said motor control circuit includes a plurality of connecting leads extending upwardly through said motor vertical mounting member, said plurality of connecting leads including a pair of motor leads, a control signal lead and a pair of power leads connected to said switch, switch means within said housing to selectively connect said motor leads to said plurality of connection leads to control the direction and level of energization of said motor.

6. An electric outboard motor having a lower submergible propeller unit connected to an upper control unit by a tubular support member, comprising a lower propeller drive housing having a motor housing section and a control housing section releasably interconnected, said control housing section having an outer wall portion, a motor control bracket including an integral U-shaped channel portion having a base and a pair of side arms, said channel portion being of resilient material, said base including a flat cantilevered plate extending therefrom, a multiple element motor control circuit including a solid state switch mounted to the back side of said plate, and securement means releasably mounting said bracket within the control housing section with said solid state switch positively releasably clamped against said outer wall portion and establishing good thermal conductivity from said switch means to said outer wall portion.

7. The electric outboard motor of claim 6 wherein said switch is a power transistor having a mounting flange and an opposite flat outer enclosure wall, said transistor mounting flange being affixed to the back side of the plate, said flat outer enclosure wall engaging said outer wall of said control housing section.

8. The electric outboard motor of claim 6 wherein said motor control circuit includes a signal limiting resistor connected to said switch, means releasably mounting said resistor on said bracket, a diode, supporting and conducting leads connected between said resistor, said switch and said diode.

9. The electric outboard motor of claim 8 including an upper terminal housing, a pair of power supply leads terminated in said terminal housing, said motor control circuit includes a plurality of connecting leads extending upwardly through said tubular support member, said plurality of connecting leads including a pair of motor leads, a control signal lead and a pair of power leads connected to said switch, a reversing switch connected to said motor leads, a speed selection switch connected to said power connecting lead and selectively to said reversing switch and to said second power lead.

10. The electric outboard motor of claim 9 wherein said switch is a power transistor having an input terminal connected to said signal lead and a pair of main terminals connected to said power leads, said speed selection switch having a common movable contact connected to one of said supply leads and a high speed contact connected to said reversing switch and a low speed contact connected to said second power lead.

11. An electric outboard motor having a lower submergible propeller unit, comprising a drive motor, a lower propeller drive housing enclosing said motor and having a cup-shaped housing member defining the forward end of the propeller unit and opening horizontally to define an access opening and having an outer wall portion, a motor control bracket releasably clamped within the outer end of said cup-shaped housing member and having a flat cantilevered plate extending inwardly therefrom, a multiple element motor control circuit including a solid state switch and interrelated control elements mounted on said bracket, said solid state switch being mounted to the back side of said plate in engagement with said outer wall portion and bending said plate relative to the wall portion and establishing good thermal conductivity from said switch means to said outer wall portion.

* * * * *